United States Patent
Raftopoulos et al.

(10) Patent No.: US 11,156,179 B1
(45) Date of Patent: Oct. 26, 2021

(54) SYSTEM AND METHOD FOR CONTROLLING AIRFLOW THROUGH CYLINDERS OF AN ENGINE DURING A DECELERATION FUEL CUTOFF EVENT

(71) Applicant: GM GLOBAL TECHNOLOGY OPERATIONS LLC, Detroit, MI (US)

(72) Inventors: Andrew A. Raftopoulos, Auburn Hills, MI (US); Michael A. Smith, Clarkston, MI (US); Robert Gallon, Northville, MI (US); Pratap S. Murthy, Dexter, MI (US); Scott T. Feldmann, South Lyon, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/038,420

(22) Filed: Sep. 30, 2020

(51) Int. Cl.
| | |
|---|---|
| *F02D 41/12* | (2006.01) |
| *F01L 1/04* | (2006.01) |
| *F02D 41/38* | (2006.01) |
| *F02D 13/02* | (2006.01) |
| *F02D 41/14* | (2006.01) |
| *F01L 5/00* | (2006.01) |
| *F01L 1/047* | (2006.01) |

(52) U.S. Cl.
CPC .......... *F02D 41/123* (2013.01); *F01L 1/047* (2013.01); *F01L 5/00* (2013.01); *F02D 13/0207* (2013.01); *F02D 41/1497* (2013.01); *F02D 41/38* (2013.01); *F02D 2200/022* (2013.01); *F02D 2200/023* (2013.01); *F02D 2200/0814* (2013.01); *F02D 2200/703* (2013.01)

(58) Field of Classification Search
CPC ........ F02D 41/12; F02D 41/123; F02D 41/14; F02D 41/1497; F02D 41/38; F02D 13/02; F02D 13/0207; F01L 5/00; F01L 1/047
USPC ....... 701/102–105, 112; 123/198 D, 198 DB, 123/198 F, 196 S
See application file for complete search history.

(56) References Cited

U.S. PATENT DOCUMENTS

| | | | | |
|---|---|---|---|---|
| 6,055,948 A | * | 5/2000 | Shiraishi ............. | F02D 13/0253 123/90.15 |
| 7,079,941 B2 | * | 7/2006 | Tetsuno ................ | F02N 99/006 701/112 |
| 7,717,071 B2 | * | 5/2010 | Lewis ................. | F02D 13/0207 123/90.11 |

(Continued)

*Primary Examiner* — John Kwon
*Assistant Examiner* — Johnny H Hoang
(74) *Attorney, Agent, or Firm* — Harness, Dickey & Pierce, P.L.C.

(57) ABSTRACT

A system includes a fuel control module and a valve control module. The fuel control module controls a fuel injector to stop fuel delivery to each cylinder of an engine in a vehicle when the vehicle is decelerating. The valve control module controls a valve actuator to actuate intake and exhaust valves of each cylinder of the engine between open and closed positions when fuel delivery to each cylinder of the engine is stopped. The valve control module controls the valve actuator to adjust an amount of airflow through each cylinder of the engine to a minimum amount when fuel delivery to each cylinder of the engine is initially stopped. The valve control module controls the valve actuator to adjust the amount of airflow through each cylinder of the engine to an amount greater than the minimum amount before fuel delivery to each cylinder of the engine is restarted.

20 Claims, 3 Drawing Sheets

(56) References Cited

U.S. PATENT DOCUMENTS

| | | | | |
|---|---|---|---|---|
| 2006/0212212 | A1* | 9/2006 | Akasaka | F02D 41/047 |
| | | | | 701/112 |
| 2008/0103683 | A1* | 5/2008 | Tabata | F02P 5/1506 |
| | | | | 701/112 |
| 2008/0243363 | A1* | 10/2008 | Idogawa | F02D 41/0002 |
| | | | | 701/105 |
| 2014/0350824 | A1* | 11/2014 | Nakao | B60W 30/18018 |
| | | | | 701/112 |

* cited by examiner

SYSTEM AND METHOD FOR CONTROLLING AIRFLOW THROUGH CYLINDERS OF AN ENGINE DURING A DECELERATION FUEL CUTOFF EVENT

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for controlling airflow through cylinders of an engine during a deceleration fuel cutoff event.

Some engine control systems perform deceleration fuel cutoff (DFCO) or deceleration cylinder cutoff (DCCO) when a vehicle is decelerating to improve the fuel efficiency of the engine. During DFCO, the engine control systems prevent (or cut off) fuel flow to all cylinders of an engine while allowing air to flow through the cylinders. During DCCO, the engine control systems prevent fuel flow to all cylinders of an engine and prevent airflow to all of the cylinders.

SUMMARY

One example of a system according to the present disclosure includes a fuel control module and a valve control module. The fuel control module is configured to control a fuel injector to stop fuel delivery to each cylinder of an engine in a vehicle when the vehicle is decelerating. The valve control module is configured to control a valve actuator to actuate an intake valve of each cylinder and an exhaust valve of each cylinder of the engine between an open position and a closed position when fuel delivery to each cylinder of the engine is stopped. In addition, the valve control module is configured to control the valve actuator to adjust an amount of airflow through each cylinder of the engine to a first target amount when fuel delivery to each cylinder of the engine is initially stopped. The first target amount is a minimum amount of airflow through each cylinder when the intake and exhaust valves are actuated between the open and closed positions. Further, the valve control module is configured to control the valve actuator to adjust the amount of airflow through each cylinder of the engine to a second target amount before fuel delivery to each cylinder of the engine is restarted. The second target amount is greater than the first target amount.

In one aspect, the system further includes a cylinder temperature module configured to predict a temperature within each cylinder of the engine at a future time, and the valve control module is configured to determine the second target amount based on the predicted cylinder temperature.

In one aspect, the cylinder temperature module is configured to predict a plurality of temperatures within each cylinder of the engine corresponding to a plurality of target amounts of airflow through each cylinder, and set the second target amount to the one of the plurality of target amounts that yields the highest one of the plurality of temperatures within each cylinder.

In one aspect, the system further includes a trapped mass module configured to predict a mass of particles trapped within each cylinder of the engine at the future time, and the valve control module is configured to determine the second target amount further based on the predicted trapped mass.

In one aspect, the cylinder temperature module is configured to predict the cylinder temperature based on at least one ambient parameter.

In one aspect, the at least one ambient parameter includes an ambient temperature, an ambient pressure, and an ambient humidity.

In one aspect, the fuel control module is configured to determine a total amount of airflow through all cylinders of the engine during a period when fuel delivery to each cylinder is stopped, and restart fuel delivery to each cylinder of the engine when the total amount of airflow is greater than or equal to an airflow limit. A catalyst in an exhaust system of the engine is saturated with oxygen when the total amount of airflow is greater than or equal to the airflow limit.

In one aspect, for each cylinder of the engine, the second target amount maximizes the cylinder temperature relative to other target amounts by which the valve actuator lifts the intake and exhaust valves.

In one aspect, the system further includes a noise and vibration module configured to predict a level of noise and vibration generated by a driveline of the vehicle when the amount of airflow through each cylinder of the engine is adjusted to the second target amount. When the predicted level is greater than a predetermined level, the valve control module is configured to adjust the amount of airflow through each cylinder of the engine to a third target amount before fuel delivery to each cylinder of the engine is restarted. The third target amount is greater than the first target amount and different than the second target amount.

In one aspect the valve control module is configured to control the valve actuator to adjust at least one of a lift and an opening duration of the intake an exhaust valves to adjust the amount of airflow through each cylinder of the engine.

Another example of a system according to the present disclosure includes a fuel control module and a valve control module. The fuel control module is configured to control a fuel injector to stop fuel delivery to each cylinder of an engine when a desired toque output of the engine is less than a predetermined torque. The valve control module is configured to control a valve actuator to actuate an intake valve of each cylinder and an exhaust valve of each cylinder of the engine between an open position and a closed position when fuel delivery to each cylinder of the engine is stopped. In addition, the valve control module is configured to adjust the valve actuator to a first lift state when fuel delivery to each cylinder of the engine is initially stopped. The valve actuator lifts the intake and exhaust valves by a first amount when the valve actuator opens the intake and exhaust valves while the valve actuator is in the first lift state. The first amount is a lowest nonzero value of a maximum amount by which the valve actuator lifts the intake and exhaust valves. Further, the valve control module is configured to adjust the valve actuator to a second lift state before fuel delivery to each cylinder of the engine is restarted. The valve actuator lifts the intake and exhaust valves by a second amount when the valve actuator opens the intake and exhaust valves while the valve actuator is in the second lift state. The second amount is greater than the first amount.

In one aspect, the system further includes a cylinder temperature module configured to predict a temperature within each cylinder of the engine at a future time, and the valve control module is configured to select the second amount based on the predicted cylinder temperature.

In one aspect, the cylinder temperature module is configured to predict a plurality of temperatures within each cylinder of the engine corresponding to a plurality of target lift amounts, and set the second amount to the one of the plurality of target lift amounts that yields the highest one of the plurality of temperatures within each cylinder.

In one aspect, the system further includes a trapped mass module configured to predict a mass of particles trapped within each cylinder of the engine at the future time, and the valve control module is configured to select the second amount further based on the predicted trapped mass.

In one aspect, the cylinder temperature module is configured to predict the cylinder temperature based on at least one ambient parameter.

In one aspect, the at least one ambient parameter includes an ambient temperature, an ambient pressure, and an ambient humidity.

In one aspect, the fuel control module is configured to determine a total amount of airflow through all cylinders of the engine during a period when fuel delivery to each cylinder is stopped, and restart fuel delivery to each cylinder of the engine when the total amount of airflow is greater than or equal to an airflow limit. A catalyst in an exhaust system of the engine is saturated with oxygen when the total amount of airflow is greater than or equal to the airflow limit.

In one aspect, for each cylinder of the engine, the second amount maximizes the cylinder temperature relative to other amounts by which the valve actuator lifts the intake and exhaust valves.

In one aspect, the system further includes a noise and vibration module configured to predict a level of noise and vibration generated by a driveline of the vehicle when the valve actuator is adjusted to the second lift state. Wen the predicted level is greater than a predetermined level, the valve control module is configured to adjust the valve actuator to a third lift state before fuel delivery to each cylinder of the engine is restarted. The valve actuator lifts the intake and exhaust valves by a third amount when the valve actuator opens the intake and exhaust valves while the valve actuator is in the second lift state. The third amount is greater than the first amount and different than the second amount.

In one aspect, the valve actuator is at least one of a cam-driven valve actuator, a camless valve actuator, a sliding cam valve actuator, and a variable valve lift actuator.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An exhaust system of an engine typically includes a three-way catalyst that reduces emissions in exhaust gas produced by the engine. When the air/fuel ratio is lean, the three-way catalyst reduces hydrocarbon and carbon monoxide and stores oxygen. When the air/fuel ratio of the engine is rich or stoichiometric, nitrous oxides and stored oxygen are used to reduce hydrocarbon and carbon monoxide in the three-way catalyst.

As discussed above, when an engine control system performs DFCO, the engine control system stops fuel flow to all cylinders of an engine while allowing air to flow through the cylinders. Thus, during a DFCO event, a three-way catalyst in an exhaust system of the engine may become saturated with oxygen. In turn, during a period immediately following the DFCO event, the ability of the three-way catalyst to reduce emissions in exhaust gas produced by the engine may be diminished until the excessive stored oxygen is consumed.

To avoid this issue, an engine control system may minimize the amount of airflow through cylinders of an engine during a DFCO event by, for example, adjusting the opening amount, duration, and/or timing of intake and exhaust valves. In one example, the engine control system adjusts a sliding camshaft and/or a cam phaser to position(s) that minimize(s) the amount of airflow through to the greatest extent possible while actuating the intake and exhaust valves. In turn, the amount of airflow through the exhaust system of the engine during a DFCO event may be significantly reduced, which may avoid saturating the three-way catalyst with oxygen.

While minimizing the amount of airflow through the cylinders during a DFCO event may avoid saturating the three-way catalyst with oxygen, it may also cause combustibility issues when fuel delivery to the cylinders is resumed after a DFCO event. For example, due to the lack of airflow to the cylinders when fuel delivery to the cylinders, the cylinders may misfire or the quality of combustion in the cylinders may be poor. Thus, the engine may have a poor restart after a DFCO event.

An engine control system according to the present disclosure minimizes the amount of airflow through the cylinders during a DFCO event, and then increases the amount of airflow through the cylinders before fuel delivery to the cylinders is resumed. The engine control system may increase the airflow through the cylinders by an amount that maximizes the temperatures in the cylinders during the restart and yields an effective compression ratio to initiate refueling effectively. In this manner, the engine control system avoids saturating the three-way catalyst with oxygen during a DFCO event and ensures that the engine does not have combustibility issues when fuel delivery to the cylinders is resumed after the DFCO event.

Figure 1:
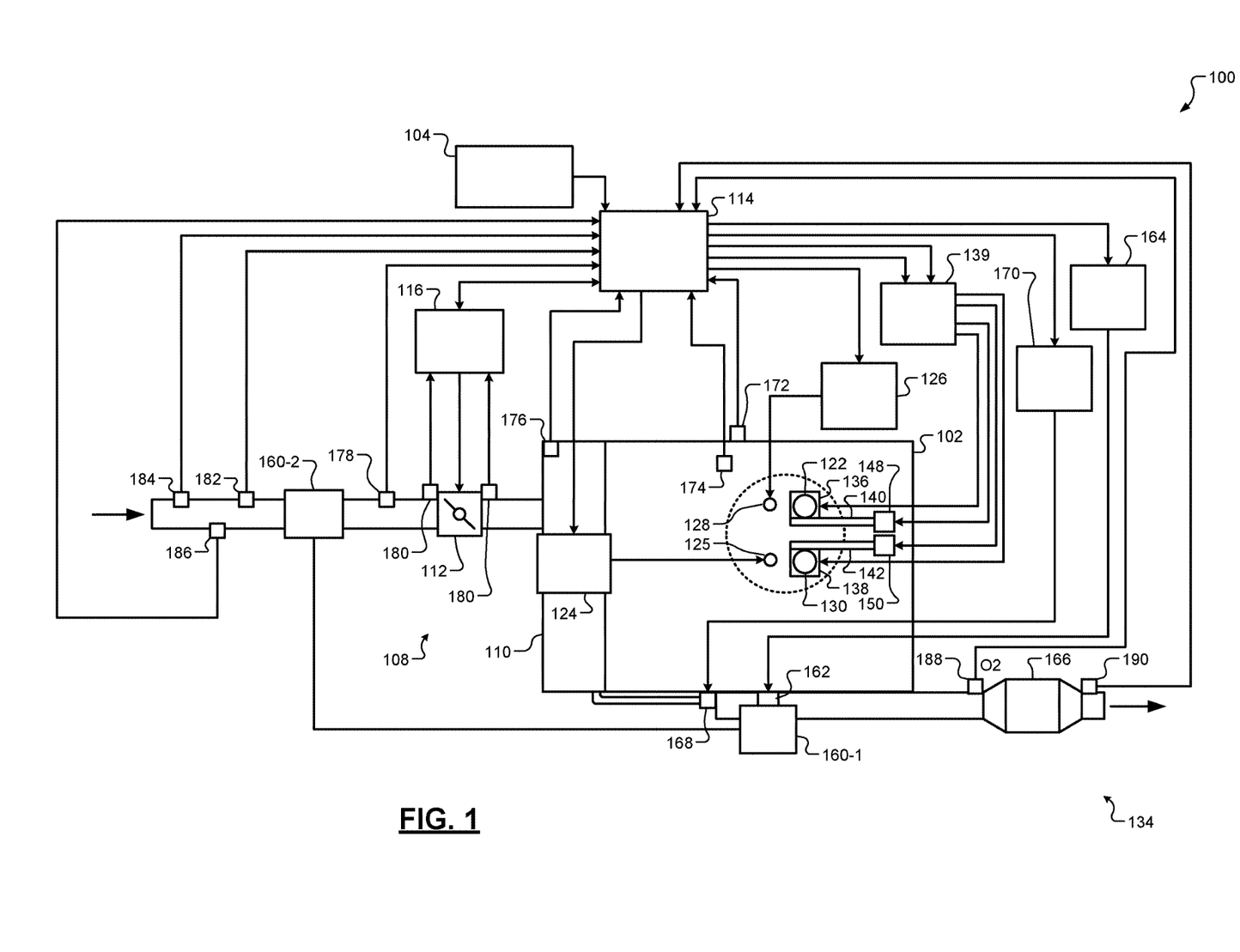
FIG. 1 is a functional block diagram of an example vehicle according to the present disclosure.

Referring now to FIG. 1, a vehicle 100 includes an engine 102 that combusts an air/fuel mixture to produce drive torque for a vehicle. The amount of drive torque produced by the engine 102 is based on acceleration request from an acceleration request module 104. The acceleration request module 104 may generate the acceleration request based on a position of an accelerator pedal and/or a speed setting of a cruise control system (not shown). The cruise control system may be an adaptive cruise control system that varies vehicle speed to maintain a predetermined following distance.

Air is drawn into the engine 102 through an intake system 108. The intake system 108 includes an intake manifold 110 and a throttle valve 112. The throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injections performed by one or more fuel injectors 125 to achieve a desired air/fuel ratio. Fuel may be injected into the intake manifold 110 at a central location or at multiple locations, such as near the intake valve 122 of each of the cylinders. In various implementations, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 to generate a spark in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a spark timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 is actuated using an intake valve actuator 136, while the exhaust valve 130 is actuated using an exhaust valve actuator 138. A valve actuator module 139 may control the intake and exhaust valve actuators 136 and 138 based on signals from the ECM 114. In various implementations, the intake valve actuator 136 may actuate multiple intake valves (including the intake valve 122) of the cylinder 118. Similarly, the exhaust valve actuator 138 may actuate multiple exhaust valves (including the exhaust valve 130) of the cylinder 118. Additionally, a single valve actuator may actuate one or more exhaust valves of the cylinder 118 and one or more intake valves of the cylinder 118. Further, the intake valve actuator 136 may actuate multiple intake valves of multiple cylinders, and the exhaust valve actuator 138 may actuate multiple exhaust valves of multiple cylinders.

In various implementations, the intake valve actuator 136 may be driven by an intake camshaft 140, and the exhaust valve actuator 138 may be driven by an exhaust camshaft 142. For example, the intake valve actuator 136 may include a rocker arm and a cam follower coupled to the rocker arm. The rocker arm may lift the intake valve 122 from its valve seat when the cam follower engages a lobe on the intake camshaft 140. Similarly, the exhaust valve actuator 138 may include a rocker arm and a cam follower coupled to the rocker arm. The rocker arm may lift the exhaust valve 130 from its valve seat when the cam follower engages a lobe on the exhaust camshaft 142.

In other implementations, the intake and exhaust valve actuators 136 and 138 may actuate the intake and exhaust valves 122 and 130 independent of a camshaft. For example, the intake and exhaust valves 122 and 130 may be electromagnetic or electrohydraulic valve actuators. In these implementations, the intake and exhaust valve actuators 136 and 138 may be referred to as camless valve actuators.

The intake and exhaust valve actuators 136 and 138 may vary the amount by which the intake and exhaust valves 122 and 130 are lifted from their respective valve seats. For example, the intake and exhaust valve actuators 136 and 138 may switch between a first lift state and a second lift state. The intake and exhaust valve actuators 136 and 138 may cause the intake and exhaust valves 122 and 130 to lift from their respective valve seats by a first amount when operating in the first lift state. The intake and exhaust valve actuators 136 and 138 may cause the intake and exhaust valves 122 and 130 to lift from their respective valve seats by a second amount when operating in the second lift state. The first and second amounts may be predetermined, nonzero values. In addition, the second amount may be greater than the first amount. In this regard, the first lift state may be referred to as a low lift state, and the second lift state may be referred to as a medium or high lift state.

In various implementations, the intake and exhaust valve actuators 136 and 138 may switch to lift states other than the first and second lift states. For example, the intake and exhaust valve actuators 136 and 138 may switch to a third lift state. The intake and exhaust valve actuators 136 and 138 may cause the intake and exhaust valves 122 and 130 to lift from their respective valve seats by a third amount when operating in the third lift state. The third amount may be a predetermined, nonzero value. In addition, the third amount may be greater than the first amount and different than the second amount. Valve actuators such as these may be referred to as variable valve lift actuators.

When the intake and exhaust valve actuators 136 and 138 are cam driven, each of the intake and exhaust valve actuators 136 and 138 may include a cam follower having a height that is adjustable to vary the lift of the intake and exhaust valves 122 and 130. Alternatively, each of the intake and exhaust valve actuators 136 and 138 may include a solenoid that translates a camshaft segment along the length of one of the camshafts 140 and 142 to cause a cam follower to engage different lobes on the camshaft segment. The lobes may have different heights so that switching which one of the lobes the cam follower engages varies the lift of the intake and exhaust valves 122 and 130. Valve actuators such as these may be referred to as sliding cam valve actuators.

When the intake and exhaust valve actuators 136 and 138 are camless valve actuators, the valve actuators 136 and 138 may also adjust the timing of the intake and exhaust valves 122 and 130, respectively. When the intake and exhaust valve actuators 136 and 138 are cam driven, the timing of the intake and exhaust valves 122 and 130 may be adjusted by intake and exhaust cam phasers 148 and 150, respectively. The valve actuator module 139 may adjust the position of the intake and exhaust cam phasers 148 and 150 based on signals received from the ECM 114.

The ECM 114 may deactivate the cylinder 118 by instructing the valve actuator module 139 to disable opening of the intake valve 122 and/or the exhaust valve 130. When the intake valve actuator 136 is cam driven, the intake valve actuator 136 may disable opening of the intake valve 122 by decoupling the intake valve 122 from the intake camshaft 140. Similarly, when the exhaust valve actuator 138 is cam driven, the exhaust valve actuator 138 may disable opening of the exhaust valve 130 by decoupling the exhaust valve 130 from the exhaust camshaft 142.

In various implementations, the valve actuator module 139 may disable opening of the intake and exhaust valves 122 and 130 by switching the intake and exhaust valve actuators 136 and 138 to a fourth lift state. The intake and exhaust valve actuators 136 and 138 may lift the intake and exhaust valves 122 and 130 from their respective valve seats by a fourth amount when operating in the fourth lift state. The fourth amount may be zero. Thus, the fourth lift state may be referred to as a zero lift state.

The vehicle 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, which compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The exhaust system 134 includes a three-way catalyst 166 and an exhaust gas recirculation (EGR) valve 168. When the air/fuel ratio is lean, the three-way catalyst 166 reduces hydrocarbon and carbon monoxide and stores oxygen. When the air/fuel ratio of the engine 102 is rich or stoichiometric, the stored oxygen and nitrogen oxides in the three-way catalyst 166 are used to reduce hydrocarbon and carbon monoxide. The EGR valve 168 selectively redirects exhaust gas back to the intake manifold 110. The EGR valve 168 may be located upstream of the turbocharger's turbine 160-1. The EGR valve 168 may be controlled by an EGR actuator module 170.

The position of the crankshaft may be measured using a crankshaft position (CKP) sensor 172. The temperature of the engine coolant may be measured using an engine coolant temperature (ECT) sensor 174. The ECT sensor 174 may be located within the engine 102 or at other locations where the coolant is circulated, such as a radiator (not shown).

The pressure within the intake manifold 110 may be measured using a manifold absolute pressure (MAP) sensor 176. In various implementations, engine vacuum, which is the difference between ambient air pressure and the pressure within the intake manifold 110, may be measured. The mass flow rate of air flowing into the intake manifold 110 may be measured using a mass airflow (MAF) sensor 178. In various implementations, the MAF sensor 178 may be located in a housing that also includes the throttle valve 112.

The throttle actuator module 116 may measure the position of the throttle valve 112 using one or more throttle position sensors (TPS) 180. The temperature of ambient air being drawn into the engine 102 may be measured using an ambient air temperature (AAT) sensor 182. The pressure of ambient air being drawn into the engine 102 may be measured using an ambient air pressure (AAP) sensor 184. The humidity of ambient air being drawn into the engine 102 may be measured using an ambient air humidity (AAH) sensor 186.

The level of oxygen in exhaust gas entering the three-way catalyst 166 may be measured using an upstream oxygen (UO2) sensor 188. The UO2 sensor 188 may be located at the inlet of the three-way catalyst 166. The level of oxygen in exhaust gas passing through or exiting the three-way catalyst 166 may be measured using a downstream oxygen sensor (DO2) sensor 190. The DO2 sensor 190 may be located at the outlet of the three-way catalyst 166 or midway between the inlet and outlet of the three-way catalyst 166.

The ECM 114 uses signals from the sensors to make control decisions for the vehicle 100. In one example, the ECM 114 enables DFCO when a desired torque output of the engine 102 is less than a predetermined torque, and instructs the fuel actuator module 124 to stop fuel delivery to all cylinders of the engine 102 when DFCO is enabled. In addition, when DFCO is initially enabled, the ECM 114 instructs the valve actuator module 139 to adjust the intake and exhaust valve actuators 136 and 138 to the first lift state. The ECM 114 disables DFCO when the desired torque output of the engine 102 is greater than or equal to the predetermined torque, and instructs the fuel actuator module 124 to restart fuel delivery to all cylinders of the engine 102 when DFCO is disabled. Before restarting fuel delivery, the ECM 114 instructs the valve actuator module 139 to adjust the intake and exhaust valve actuators 136 and 138 to the second lift state. As discussed above, the intake and exhaust valve actuators 136 and 138 may lift the intake and exhaust valves 122 and 130 from their respective valve seats by the first and second amounts when operating in the first and second lift states, respectively. In this example, the first amount is the lowest value of the maximum amount by which the intake and exhaust valve actuators 136 and 138 lift the intake and exhaust valves 122 and 130, and the second amount is greater than the first amount.

Figure 2:
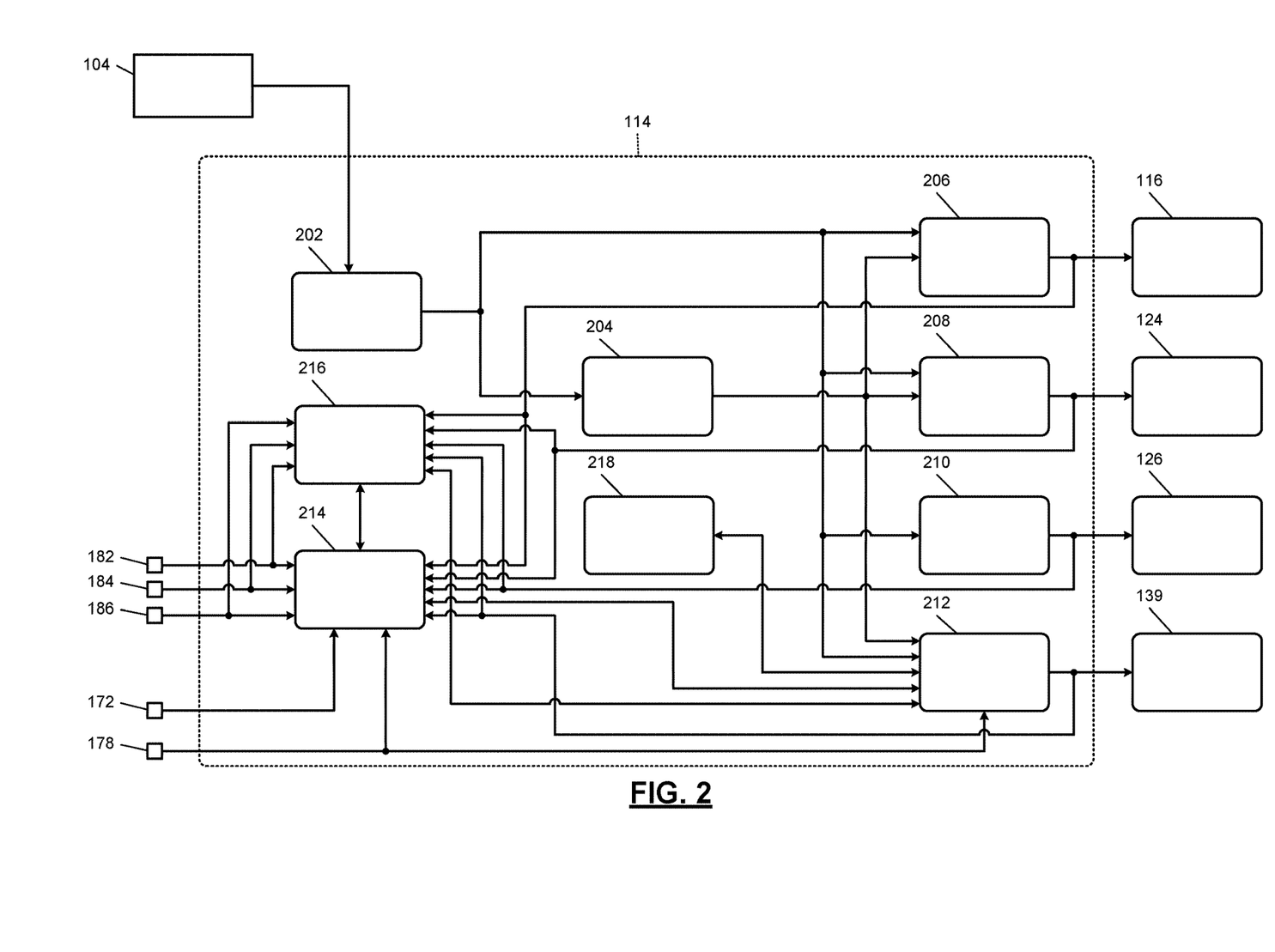
FIG. 2 is a functional block diagram of an example engine control module according to the present disclosure.

Referring now to FIG. 2, an example implementation of the ECM 114 includes a torque request module 202, a DFCO module 204, a throttle control module 206, a fuel control module 208, a spark control module 210, and a valve control module 212. The torque request module 202 generates an engine torque request, which is a desired torque output of the engine 102. The torque request module 202 may generate the engine torque request based on the acceleration request from the acceleration request module 104. Additionally or alternatively, the torque request module 202 may generate the engine torque request based on the speed of the vehicle 100, which may be measured. The torque request module 202 outputs the engine torque request.

The DFCO module 204 determines whether to enable or disable DFCO based on the engine torque request. In one example, the DFCO module 204 enables DFCO when the engine torque request is less than a predetermined value (e.g., zero), indicating that the vehicle 100 is decelerating, coasting, or accelerating down a hill. The DFCO module 204 then disables DFCO when the engine torque request is greater than or equal to the predetermined value. The DFCO module 204 outputs a signal indicating whether DFCO is enable or disabled.

The throttle control module 206 controls the position of the throttle valve 112. For example, the throttle control module 206 may output a signal indicating a target position of the throttle valve 112, and the throttle actuator module 116 may control the throttle valve 112 to minimize the difference between the target throttle position and the measured throttle position. When the engine 102 is operating normally, the throttle control module 206 may adjust the throttle valve 112 between an open position and a closed position based on the engine torque request from the torque request module 202. When DFCO is initially enabled, the throttle control module 206 may adjust the throttle valve 112 to a minimum open position to reduce the amount of airflow into cylinders of the engine 102. When DFCO is disabled, the throttle control module 206 may increase the amount by which the throttle valve 112 is open relative to the minimum open position before fuel delivery to cylinders of the engine 102 is restarted. For example, the throttle control module 206 may adjust the throttle valve 112 to a position that maximizes the temperature in the cylinders of the engine 102 (e.g., achieves the highest average temperature in the cylinders relative to other possible throttle positions).

The fuel control module 208 controls the amount of fuel injected by the fuel injectors 125 and the timing of the fuel injections. When the engine 102 is operating normally, the fuel control module 208 may control the fuel injectors 125 to inject fuel based on the engine torque request from the torque request module 202. For example, the fuel control module 208 may determine a target fuel injection amount and a target fuel injection timing based on the engine torque request from the torque request module 202, and output a signal indicating the target fuel injection amount and timing. The fuel actuator module 124 may then control the fuel injectors 125 to achieve the target fuel injection amount and timing. When DFCO is enabled, the fuel control module 208 may control the flow injectors 125 to stop fuel injection in all cylinders of the engine 102. For example, the fuel control module 208 may set the target fuel injection amount to zero and, in response, the fuel actuator module 124 may control all of the fuel injectors 125 to stop injecting fuel. When DFCO is disabled, the fuel control module 208 may control the flow injectors 125 to restart (or resume) fuel injection in all cylinders of the engine 102.

The spark control module 210 controls the spark plugs of the engine 102 (including the spark plug 128) to generate spark in cylinders of the engine 102. When the engine 102 is operating normally, the spark control module 210 may control the spark plugs of the engine 102 to generate spark based on the engine torque request from the torque request module 202. For example, the spark control module 210 may determine a target spark timing based on the engine torque request from the torque request module 202, and the spark actuator module 26 may control the spark plugs of the engine 102 to achieve the target spark timing. When DFCO is enabled, the spark control module 210 may continue to control the spark plugs of the engine 102 to generate spark based on the engine torque request.

The valve control module 212 controls the opening amount, duration, and start time of the intake and exhaust valves of the engine 102 (including the intake and exhaust valves 122 and 130). For example, the valve control module 212 may output a signal indicating target positions of the intake and exhaust valves 122 and 130 with respect to time, and the valve actuator module 139 may control the intake and exhaust valve actuators 136 and 138 to achieve the target valve positions. The valve control module 212 may specify the target valve positions in terms of a target maximum open amount and/or a target opening timing. In another example, the valve control module 212 may output a signal indicating a target lift state of the intake and exhaust valve actuators 136 and 138, and the valve actuator module 139 may adjust the intake and exhaust valve actuators 136 and 138 to the target lift state.

When the engine 102 is operating normally, the valve control module 212 may select a maximum open position of the intake and exhaust valves 122 and 130 based on the engine torque request from the torque request module 202. When DFCO is initially enabled, the valve control module 212 may select the lowest possible maximum open position of the intake and exhaust valves 122 and 130 based on the actuation capability of the intake and exhaust valve actuators 136 and 138. When DFCO is disabled, the valve control module 212 may increase the maximum open position of the intake and exhaust valves 122 and 130 before fuel delivery to cylinders of the engine 102 is restarted. The valve control module 212 may select a maximum open position of the intake and exhaust valves 122 and 130 that maximizes the temperature in the corresponding cylinder (e.g., achieves the highest temperature in that cylinder relative to other possible maximum open position positions).

The example implementation of the ECM 114 shown in FIG. 2 further includes a cylinder temperature module 214, a trapped mass module 216, and a noise and vibration module 218. The cylinder temperature module 214 predicts the temperature in each cylinder of the engine 102 at a future time (e.g., a time corresponding to the next control loop iteration for which target control values of the engine 102 are determined). The cylinder temperature module 214 may predict the cylinder temperatures based on ambient conditions such as the ambient temperature from the AAT sensor 182, the ambient pressure from the AAP sensor 184, and/or the ambient humidity from the AAH sensor 186. Additionally or alternatively, the cylinder temperature module 214 may predict the cylinder temperatures based on the speed of the engine 102 and/or the load on the engine 102. The cylinder temperature module 214 may determine the engine speed and the engine load based on inputs from the CKP sensor 172 and the MAF sensor 178, respectively. Additionally or alternatively, the cylinder temperature module 214 may predict the cylinder temperatures based on the target throttle position output by the throttle control module 206, the target fuel injection amount and timing output by the fuel control module 208, the target spark timing output by the spark control module 210, and/or the target valve positions output by the valve control module 212. The cylinder temperature module 214 outputs the predicted cylinder temperatures.

The cylinder temperature module 214 may predict the temperature in each cylinder of the engine 102 based on one or more (e.g., all) of the aforementioned parameters using a function (e.g., an equation) and/or a mapping (e.g., a lookup table). The mapping may be developed by measuring one or more of the aforementioned parameters while also measuring the cylinder temperatures to develop a relationship between cylinder temperatures and the other measured parameters. For example, the ambient temperature, the ambient pressure, the ambient humidity, and the cylinder temperature may be measured in a laboratory setting or in a development vehicle to develop the aforementioned relationship. Then, the vehicle 100 does not need to include a cylinder temperature sensor, as the cylinder temperature module 214 may predict the cylinder temperature using the function and/or the mapping.

The valve control module 212 may select the maximum open position(s) of the intake and exhaust valves 122 and 130 when DFCO is disabled, and before fuel delivery to cylinders of the engine 102 is restarted, based on the predicted cylinder temperatures. The valve control module 212 may select the maximum open position(s) of the intake and exhaust valves 122 and 130 that maximizes the temperature of each cylinder of the engine 102 when fuel delivery to all cylinders of the engine 102 is restarted. For example, for each cylinder of the engine 102, valve control module 212 may send a plurality of possible maximum open positions to the cylinder temperature module 214, and the cylinder temperature module 214 may predict a plurality of cylinder temperatures corresponding to the plurality of possible maximum open positions. The valve control module 212 may then select the one of the maximum open positions that yields the highest one of the predicted cylinder temperatures.

The trapped mass module 216 predicts a mass of particles (e.g., air particles, unburned fuel particles, exhaust particles) trapped or otherwise disposed within each cylinder of the engine 102 at the future time. The trapped mass module 216 may predict the trapped masses based on ambient conditions such as the ambient temperature from the AAT sensor 182, the ambient pressure from the AAP sensor 184, and/or the ambient humidity from the AAH sensor 186. Additionally or alternatively, the trapped mass module 216 may predict the trapped masses based on the speed of the engine 102 and/or the load on the engine 102. The trapped mass module 216 may receive the engine speed and the engine load from the cylinder temperature module 214. Additionally or alternatively, the trapped mass module 216 may predict the trapped masses based on the target throttle position output by the throttle control module 206, the target fuel injection amount and timing output by the fuel control module 208, the target spark timing output by the spark control module 210, and/or the target valve positions output by the valve control module 212.

The trapped mass module 216 may predict the mass of particles trapped or otherwise disposed in each cylinder of the engine 102 based on one or more of the aforementioned parameters using a function (e.g., an equation) and/or a mapping (e.g., a lookup table). For example, the trapped mass module 216 may predict the cylinder trapped masses using a mathematical (e.g., physics-based) model that relates one or more of the aforementioned parameters to cylinder temperature. The trapped mass module 216 outputs the predicted trapped masses.

The cylinder temperature module 214 may predict the temperature in each cylinder of the engine at the future time based on the predicted trap mass within the respective cylinder at the future time using, for example, a function and/or a mapping. Additionally or alternatively, the valve control module 212 may select the maximum open position(s) of the intake and exhaust valves 122 and 130 when DFCO is disabled, and before fuel delivery to cylinders of the engine 102 is restarted, based on the predicted trapped masses.

The noise and vibration module 218 predicts a level of noise and vibration generated by a driveline of the vehicle 100 at the future time. The noise and vibration module 218 may predict the noise and vibration level based on the target maximum open positions of the intake and exhaust valves 122 and 130 at the future time using, for example, a function and/or a mapping. Additionally or alternatively, the noise and vibration module 218 may predict the noise and vibration level based on a target amount of airflow through each cylinder of the engine 102 at the future time using, for example, a function and/or a mapping. The noise and vibration module 218 outputs the predicted noise and vibration level.

The valve control module 212 may adjust the target maximum open positions of the intake and exhaust valves 122 and 130 and/or the target amount of airflow through each cylinder of the engine 102 based on the predicted noise and vibration level. For example, when DFCO is disabled and before fuel delivery to all cylinders of the engine 102 is restarted, the valve control module 212 may initially set the target maximum open position of the intake and exhaust valves 122 and 130 to the second amount. The noise and vibration module 218 may then predict the noise and vibration level when the maximum open position of the intake and exhaust valves 122 and 130 is adjusted to the second amount. If the predicted noise and vibration level is greater than a predetermined level, the valve control module 212 may adjust the target maximum open position of the intake and exhaust valves 122 and 130 to a third amount. The third amount may be greater than the first amount and different than the second amount. In one example, the third amount may be the maximum opening position of the intake and exhaust valves 122 and 130 that maximizes the cylinder temperature when fuel delivery is restarted while maintaining the noise and vibration level below the predetermined level.

Figure 3:
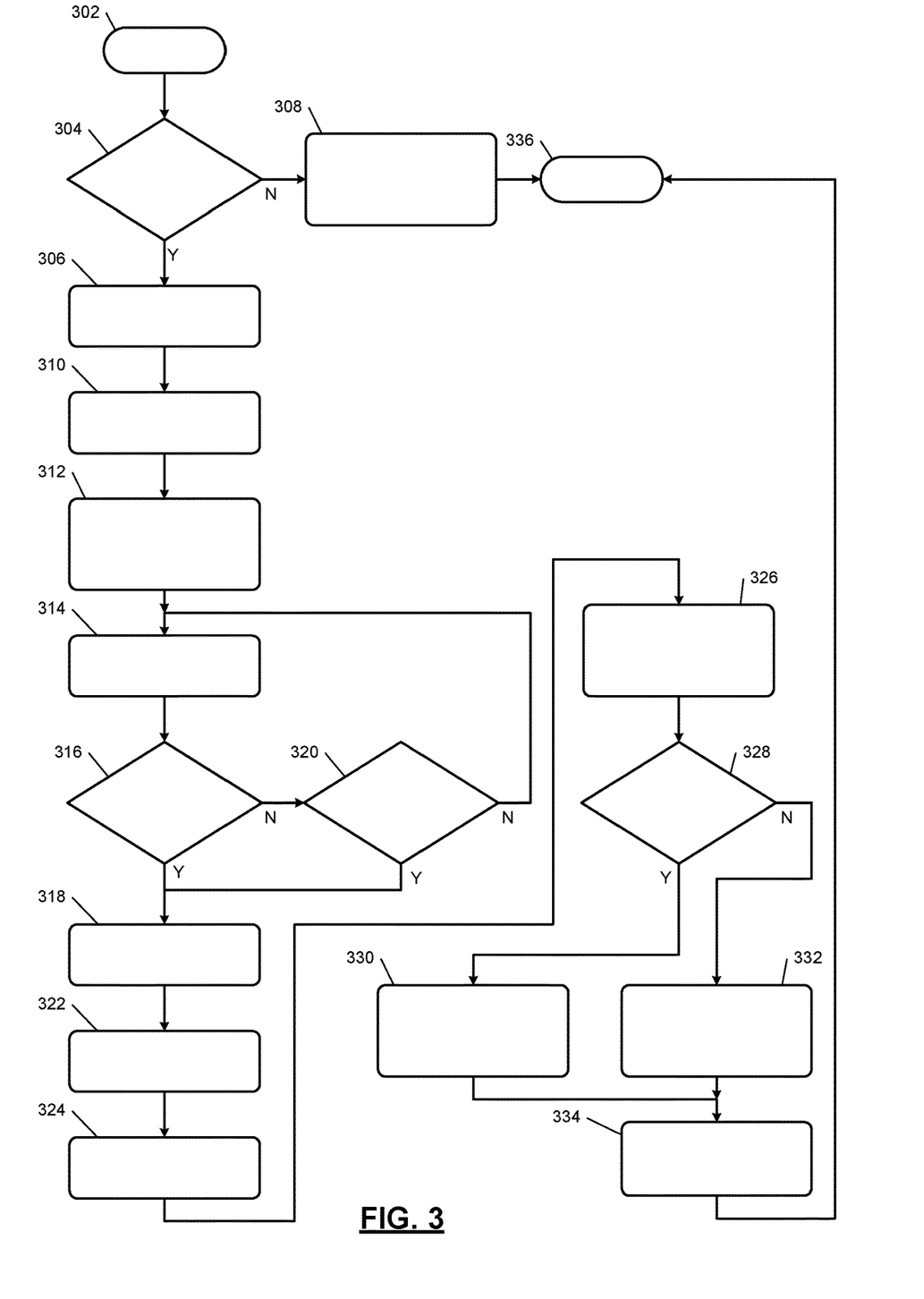
FIG. 3 is a flowchart illustrating an example method for controlling airflow and fuel flow to cylinders of an engine during a deceleration fuel cutoff event according to the present disclosure.

Referring now to FIG. 3, example method for controlling airflow and fuel flow to cylinders of the engine 102 during a DFCO event begins at 302. The method is described in the context of the modules of FIG. 2. However, the particular modules that perform the steps of the method may be different than the modules mentioned below and/or one or more steps of the method may be implemented apart from the modules of FIG. 2.

At 304, the fuel control module 208 and/or the valve control module 212 determine whether DFCO is enabled. As discussed above, the DFCO module 204 may enable DFCO when the engine torque request is less than a predetermined torque. If DFCO is enabled, the method continues at 306. Otherwise, the method continues at 308. At 308, the valve control module 212 adjusts the lift (i.e., the maximum open position) and/or timing of the intake and exhaust valves 122 and 130 to maximize the fuel economy of the engine 102 while satisfying the engine torque request.

At 306, the valve control module 212 determines a first target amount of airflow through each cylinder of the engine 102. The first target amount may be the minimum amount of airflow through each cylinder of the engine 102 when the intake and exhaust valves 122 and 130 are actuated between their respective open and closed positions. For example, the first target amount may correspond to the amount of airflow through each cylinder of the engine 102 when the intake and exhaust valve actuators are adjusted to the first (e.g., low) lift state.

At 310, the fuel control module 208 controls the fuel injectors 125 to stop fuel delivery to all cylinders of the engine 102. At 312, the valve control module 212 adjusts the lift and/or opening timing of the intake and exhaust valves 122 and 130 to achieve the first target amount of airflow. For example, the valve control module 212 may adjust the intake and exhaust valve actuators 136 and 138 to the first lift state. Additionally or alternatively, the valve control module 212 may adjust the positions of the intake and exhaust cam phasers 148 and 150 to adjust the opening timing of the intake and exhaust valves 122 and 130 to achieve the first target amount of airflow.

At 314, the valve control module 212 determines the total amount of airflow through all cylinders of the engine 102 during the current DFCO event. The valve control module 212 may determine the total airflow amount based on the mass flow rate of intake air from the MAF sensor 178. For example, the valve control module 212 multiply the mass flow rate by a sampling period of the MAF sensor 178 to obtain the amount of airflow during that sampling period. The valve control module 212 may repeat this process for every sampling period during the DFCO event and determine a sum of all of the airflow amounts to obtain the total airflow amount.

At 316, the fuel control module 208 and/or the valve control module 212 determine whether DFCO is disabled. As discussed above, the DFCO module 204 may disable DFCO when the engine torque request is greater than or equal to the predetermined torque. If DFCO is disabled, the method continues at 318. Otherwise, the method continues at 320.

At 320, the valve control module determines whether the total airflow amount is greater than or equal to an airflow limit, which indicates that the three-way catalyst 166 is saturated with oxygen. The airflow limit may be predetermined. When the total airflow amount is greater than or equal to an airflow limit, the method continues at 318. Otherwise, the method returns to 314.

At 318, the trapped mass module 216 predicts the mass of particles trapped in each cylinder of the engine 102 at a future time (e.g., at a time corresponding to the next control loop iteration for which target control values of the engine 102 are determined). As discussed above, the trapped mass module 216 may predict the cylinder trapped masses based on one or more of the following parameters: the ambient temperature, the ambient pressure, the ambient humidity, the engine speed, the engine load, the target throttle position, the target fuel injection amount and timing, the target spark timing, and/or the target valve positions. The trapped mass module 216 may predict the cylinder trapped masses based on these parameters using a function and/or a mapping.

At 322, the cylinder temperature module 214 predicts the temperature in each cylinder of the engine 102 at the future time. As discussed above, the cylinder temperature module 214 may predict the cylinder temperatures based on one or more of the following parameters: the ambient temperature, the ambient pressure, the ambient humidity, the engine speed, the engine load, the target throttle position, the target fuel injection amount and timing, the target spark timing, the target valve positions, and/or the cylinder trapped masses. The trapped mass module 216 may predict the cylinder temperatures based on these parameters using a function and/or a mapping.

At 324, the valve control module 212 determines a second target amount of airflow through each cylinder of the engine 102. The valve control module 212 may set the second target amount of airflow through each cylinder of the engine 102 to a value that maximizes the temperature in that cylinder when fuel delivery to all cylinders of the engine 102 is restarted. For example, the cylinder temperature module 214 may predict a plurality of cylinder temperatures corresponding to a plurality of possible target airflow amounts. In turn, the valve control module 212 may set the second target amount to the one of the possible airflow amounts that yields the highest one of the predicted cylinder temperatures.

At 326, the noise and vibration module 218 predicts the level of noise and vibration generated by the driveline of the vehicle when the amount of airflow through each cylinder of the engine 102 is set to the second target amount. As discussed above, the noise and vibration module 218 may predict the driveline noise and vibration level corresponding to the second target amount of airflow per cylinder using a function and/or a mapping. At 328, the valve control module 212 determines whether the predicted level of noise and vibration is less than a predetermined level. If the predicted level of noise and vibration is less than the predetermined level, the method continues at 330. Otherwise, the method continues at 332.

At 330, the valve control module 212 adjusts the lift and/or opening timing of the intake and exhaust valves 122 and 130 to achieve the second target amount of airflow through each cylinder of the engine 102. For example, the valve control module 212 may adjust the intake and exhaust valve actuators 136 and 138 to the second lift state. Additionally or alternatively, the valve control module 212 may adjust the positions of the intake and exhaust cam phasers 148 and 150 to adjust the opening timing of the intake and exhaust valves 122 and 130 to achieve the second target amount of airflow.

At 332, the valve control module 212 adjusts the lift and/or opening timing of the intake and exhaust valves 122 and 130 to achieve a third target amount of airflow through each cylinder of the engine 102. The valve control module 212 may adjust the intake and exhaust valve actuators 136 and 138 to a third lift state and/or adjust the positions of the intake and exhaust cam phasers 148 and 150 to achieve the third target amount of airflow. The third target amount may be greater than the first target amount and different than the second target amount. In one example, the third target amount may be the amount of airflow through each cylinder of the engine 102 that maximizes the cylinder temperature when fuel delivery is restarted while maintaining the noise and vibration level below the predetermined level.

At 334, the fuel control module 208 restarts fuel delivery to all cylinders of the engine 102. The method ends at 336. The method of FIG. 3 may be repeatedly performed while the engine 102 is operating.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
a fuel control module configured to control a fuel injector to stop fuel delivery to each cylinder of an engine in a vehicle when the vehicle is decelerating; and
a valve control module is configured to:
control a valve actuator to actuate an intake valve of each cylinder and an exhaust valve of each cylinder of the engine between an open position and a closed position when fuel delivery to each cylinder of the engine is stopped;
control the valve actuator to adjust an amount of airflow through each cylinder of the engine to a first target amount when fuel delivery to each cylinder of the engine is initially stopped, wherein the first target amount is a minimum amount of airflow through each cylinder when the intake and exhaust valves are actuated between the open and closed positions; and
control the valve actuator to adjust the amount of airflow through each cylinder of the engine to a second target amount before fuel delivery to each cylinder of the engine is restarted, wherein the second target amount is greater than the first target amount.

2. The system of claim 1 further comprising a cylinder temperature module configured to predict a temperature within each cylinder of the engine at a future time, wherein the valve control module is configured to determine the second target amount based on the predicted cylinder temperature.

3. The system of claim 2 wherein the cylinder temperature module is configured to:
predict a plurality of temperatures within each cylinder of the engine corresponding to a plurality of target amounts of airflow through each cylinder; and
set the second target amount to the one of the plurality of target amounts that yields the highest one of the plurality of temperatures within each cylinder.

4. The system of claim 2 further comprising a trapped mass module configured to predict a mass of particles trapped within each cylinder of the engine at the future time, wherein the valve control module is configured to determine the second target amount further based on the predicted trapped mass.

5. The system of claim 2 wherein the cylinder temperature module is configured to predict the cylinder temperature based on at least one ambient parameter.

6. The system of claim 5 wherein the at least one ambient parameter includes an ambient temperature, an ambient pressure, and an ambient humidity.

7. The system of claim 1 wherein the fuel control module is configured to:
determine a total amount of airflow through all cylinders of the engine during a period when fuel delivery to each cylinder is stopped; and
restart fuel delivery to each cylinder of the engine when the total amount of airflow is greater than or equal to an airflow limit, wherein a catalyst in an exhaust system of the engine is saturated with oxygen when the total amount of airflow is greater than or equal to the airflow limit.

8. The system of claim 2 wherein, for each cylinder of the engine, the second target amount maximizes the cylinder temperature relative to other target amounts by which the valve actuator lifts the intake and exhaust valves.

9. The system of claim 8 further comprising a noise and vibration module configured to predict a level of noise and vibration generated by a driveline of the vehicle when the amount of airflow through each cylinder of the engine is adjusted to the second target amount, wherein:
when the predicted level is greater than a predetermined level, the valve control module is configured to adjust the amount of airflow through each cylinder of the engine to a third target amount before fuel delivery to each cylinder of the engine is restarted; and
the third target amount is greater than the first target amount and different than the second target amount.

10. The system of claim 1 wherein the valve control module is configured to control the valve actuator to adjust at least one of a lift and an opening duration of the intake an exhaust valves to adjust the amount of airflow through each cylinder of the engine.

11. A system comprising:
a fuel control module configured to control a fuel injector to stop fuel delivery to each cylinder of an engine when a desired toque output of the engine is less than a predetermined torque; and
a valve control module is configured to:
control a valve actuator to actuate an intake valve of each cylinder and an exhaust valve of each cylinder of the engine between an open position and a closed position when fuel delivery to each cylinder of the engine is stopped;
adjust the valve actuator to a first lift state when fuel delivery to each cylinder of the engine is initially stopped, wherein:
the valve actuator lifts the intake and exhaust valves by a first amount when the valve actuator opens the intake and exhaust valves while the valve actuator is in the first lift state; and
the first amount is a lowest nonzero value of a maximum amount by which the valve actuator lifts the intake and exhaust valves; and
adjust the valve actuator to a second lift state before fuel delivery to each cylinder of the engine is restarted, wherein:
the valve actuator lifts the intake and exhaust valves by a second amount when the valve actuator opens the intake and exhaust valves while the valve actuator is in the second lift state; and
the second amount is greater than the first amount.

12. The system of claim 11 further comprising a cylinder temperature module configured to predict a temperature within each cylinder of the engine at a future time, wherein the valve control module is configured to select the second amount based on the predicted cylinder temperature.

13. The system of claim 12 wherein the cylinder temperature module is configured to:
predict a plurality of temperatures within each cylinder of the engine corresponding to a plurality of target lift amounts; and set the second amount to the one of the plurality of target lift amounts that yields the highest one of the plurality of temperatures within each cylinder.

14. The system of claim 12 further comprising a trapped mass module configured to predict a mass of particles trapped within each cylinder of the engine at the future time, wherein the valve control module is configured to select the second amount further based on the predicted trapped mass.

15. The system of claim 12 wherein the cylinder temperature module is configured to predict the cylinder temperature based on at least one ambient parameter.

16. The system of claim 15 wherein the at least one ambient parameter includes an ambient temperature, an ambient pressure, and an ambient humidity.

17. The system of claim 11 wherein the fuel control module is configured to:
determine a total amount of airflow through all cylinders of the engine during a period when fuel delivery to each cylinder is stopped; and
restart fuel delivery to each cylinder of the engine when the total amount of airflow is greater than or equal to an airflow limit, wherein a catalyst in an exhaust system of the engine is saturated with oxygen when the total amount of airflow is greater than or equal to the airflow limit.

18. The system of claim 12 wherein, for each cylinder of the engine, the second amount maximizes the cylinder temperature relative to other amounts by which the valve actuator lifts the intake and exhaust valves.

19. The system of claim 18 further comprising a noise and vibration module configured to predict a level of noise and vibration generated by a driveline of a vehicle when the valve actuator is adjusted to the second lift state, wherein:
when the predicted level is greater than a predetermined level, the valve control module is configured to adjust the valve actuator to a third lift state before fuel delivery to each cylinder of the engine is restarted;
the valve actuator lifts the intake and exhaust valves by a third amount when the valve actuator opens the intake and exhaust valves while the valve actuator is in the second lift state; and
the third amount is greater than the first amount and different than the second amount.

20. The system of claim 11 wherein the valve actuator is at least one of a cam-driven valve actuator, a camless valve actuator, a sliding cam valve actuator, and a variable valve lift actuator.

* * * * *